United States Patent
Tsuyuki et al.

(10) Patent No.: US 7,508,982 B2
(45) Date of Patent: Mar. 24, 2009

(54) IMAGE PROCESSING APPARATUS, METHOD, AND STORAGE MEDIUM FOR REMOVING NOISE FROM STEREOSCOPIC IMAGE PAIR

(75) Inventors: Tatsuhide Tsuyuki, Kanagawa (JP); Shuji Ono, Kanagawa (JP); Hideo Miura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 777 days.

(21) Appl. No.: 10/668,176

(22) Filed: Sep. 24, 2003

(65) Prior Publication Data

US 2004/0062434 A1 Apr. 1, 2004

(30) Foreign Application Priority Data

Sep. 27, 2002 (JP) ............................. 2002-283818

(51) Int. Cl.
*G06K 9/00* (2006.01)
*G06K 9/40* (2006.01)

(52) U.S. Cl. ..................... 382/167; 382/154; 382/275

(58) Field of Classification Search ................. 382/154, 382/167, 264, 275; 356/12
See application file for complete search history.

(56) References Cited

U.S. PATENT DOCUMENTS

| | | | | |
|---|---|---|---|---|
| 4,709,263 A | * | 11/1987 | Brumage | 348/42 |
| 5,113,137 A | * | 5/1992 | Koizumi et al. | 324/307 |
| 5,202,928 A | * | 4/1993 | Tomita et al. | 382/154 |
| 5,719,954 A | * | 2/1998 | Onda | 382/154 |
| 6,549,650 B1 | * | 4/2003 | Ishikawa et al. | 382/154 |
| 6,563,536 B1 | * | 5/2003 | Rashkovskiy et al. | 348/243 |
| 6,603,535 B1 | * | 8/2003 | McDowell | 356/28 |
| 6,674,892 B1 | * | 1/2004 | Melen | 382/154 |
| 6,714,672 B1 | * | 3/2004 | Berestov et al. | 382/154 |
| 6,862,364 B1 | * | 3/2005 | Berestov | 382/132 |
| 6,873,723 B1 | * | 3/2005 | Aucsmith et al. | 382/154 |
| 2003/0128273 A1 | * | 7/2003 | Matsui et al. | 348/51 |

FOREIGN PATENT DOCUMENTS

| | | |
|---|---|---|
| JP | 11-275350 A | 8/1999 |
| JP | 2001-144964 A | 5/2001 |
| JP | 2001-285640 A | 12/2001 |

\* cited by examiner

*Primary Examiner*—Yubin Hung
(74) *Attorney, Agent, or Firm*—Sughrue Mion, PLLC (57) ABSTRACT

Light that is incident through a pair of object lenses of digital binocular glasses is photographed by a pair of image pickup devices to obtain a pair of images (stereoscopic image) generating a difference corresponding to a parallax of both eyes. A geometric difference between image structures corresponding to a parallax of both eyes is recognized in the pair of images subjected to various corrections and stored in memories. Thereafter, a noise reduction process is performed, which reduces a difference (for example, a difference between random noises superposed on the pair of images by the image pickup devices) other than the recognized geometric difference between the image structures. The images subjected to the noise reduction process are displayed on a pair of display devices, and are visually recognized (stereoscopically viewed) by the user through eyepiece lenses.

16 Claims, 5 Drawing Sheets

FIG.5A
EXAMPLE OF LEFT-CHANNEL IMAGE

FIG.5B
EXAMPLE OF RIGHT-CHANNEL IMAGE

FIG.5C
EXAMPLE OF CORRESPONDING POINT CANDIDATE EXTRACTED FROM LEFT-CHANNEL IMAGE

FIG.5D
EXAMPLE OF CORRESPONDING POINT CANDIDATE EXTRACTED FROM RIGHT-CHANNEL IMAGE

FIG.5E
EXAMPLE OF MATCHING RESULT (CORRESPONDING POINT AND DIFFERENCE VECTOR)

IMAGE PROCESSING APPARATUS, METHOD, AND STORAGE MEDIUM FOR REMOVING NOISE FROM STEREOSCOPIC IMAGE PAIR

CROSS-REFERENCE TO RELATED APPLICATION

This application claims priority under 35 USC 119 from Japanese Patent Application No. 2002-283818, the disclosure of which is incorporated by reference herein.

BACKGROUND OF THE INVENTION

1. Field of the Invention

The present invention relates to an image processing apparatus, image processing method, and a storage medium, and more particularly, to an image processing method which improves a pair of images which are formed to generate a difference corresponding to a parallax of both eyes, an image processing apparatus to which the image processing method is applied, and a storage medium in which a program for realizing the processing method is stored.

2. Description of the Related Art

A stereoscopic image (also called a stereoscopic photograph or a three-dimensional photograph) which can be stereoscopically viewed is composed of a pair of images (still images or video images), which are photographed to generate a difference corresponding to a parallax of both eyes. A stereoscopic effect can be enjoyed by viewing with the naked eye or by means of an instrument such as a viewer. For example, the stereoscopic image can be obtained by photographing the same object at two points having an interval, which is almost equal to or greater than an interval (interocular distance) between the eyes of a person. However, the stereoscopic image can be realized not only by a method using a dedicated camera but also by a simple and low-cost method in which two conventional cameras are arranged. Although this method is currently only known by some users, widespread permeation is a possibility in the future.

On the other hand, an optical image is photoelectrically converted by an image pickup device, and an image signal obtained by the photoelectric conversion is converted into digital data to obtain a digital image. Various methods have been known for reducing noise from the digital image, one example being the following method. That is, an original image is divided into a plurality of small blocks, and template profiles which typically represent image data in the blocks are calculated. Then, the original image data profiles in the blocks are approximated by using the calculated template profiles, and the original data obtained by the approximation are replaced to remove the noise from the image data (refer to, for example, Japanese Patent Application Laid-Open (JP-A) No. 2001-144964).

Furthermore, the following method is also used. That is, smoothing and edge detection are performed on an original image data, and mixed image data in which edges and noise of an object are mixed is calculated from the smoothed image data. A weighting coefficient of noise is calculated from an edge strength data calculated by edge detection, and noise data is calculated from the weighting coefficient of noise and the mixed image data. On the other hand, a noise suppression distribution function representing the spread of noise suppression is set, and convolution integral between the function and the noise data is performed to calculate a noise suppression distribution. The noise data is multiplied by the noise suppression distribution to calculate a noise suppression component, the noise suppression component is variably powered to subtract the powered noise suppression component from the image data, thereby suppressing noise (refer to, for example, JP-A No. 2001-285640).

In addition, the following method is also known. That is, for example, an input image signal obtained by photoelectrically reading a film original is decomposed into a high-frequency component and another component to emphasize the high-frequency component. When the film original is at least one of a film in underexposure or a high-speed film, the component other than the high-frequency component is decomposed into two or more components such that the band of the lowest frequency component becomes even narrower, and the frequency component other than the high-frequency component and the lowest-frequency component is suppressed to suppress granulated (noise) (refer to, for example, JP-A No. 11-275350).

The inventors of the present application performed an experiment in which a stereoscopic image photographed by two digital still cameras (DSC) was recorded on a recording material such as a film, and the stereoscopic image was stereoscopically viewed to evaluate the image quality. Results shown that when the right and left images of the stereoscopic image included a difference other than the difference corresponding to a parallax of both eyes, a considerably conspicuous image quality defect was visually recognized when stereoscopically viewing the stereoscopic image.

For example, depending on the characteristics of a CCD incorporated in the DSC as an image pickup device, visible noises were generated in an image photographed by a DSC. The visible noises were generated particularly in high concentration regions (regions with minimal volume of incident light within an entire photographed scene during a photographing state). This noise was not so conspicuous as long as a single image was seen. However, since the noise was random, different noise patterns appeared in the right and left images of the stereoscopic image. When the stereoscopic image in which such noises appeared was stereoscopically viewed, for an appreciator, it appeared that noise patterns were suspended in a space and flicker. The noises were visually conspicuous compared to when a single image was seen.

The above phenomenon is thought to be due to the visual sense of the human being having such characteristics that different regions in the left and right images sensed by both eyes have high sensibilities, and the brain of the appreciator who recognizes the different regions in the left and right images interprets the regions as being polish of a metal or the like based on past experience.

In contrast to this, all of the aforementioned methods of reducing noise from digital images target a single image. Even when the methods are applied to images of a stereoscopic image, it is difficult to reduce or eliminate defects in image quality which are visually conspicuous when the stereoscopic image is stereoscopically viewed.

SUMMARY OF THE INVENTION

The present invention has been made in consideration of the above facts, and has as its object to provide an image processing apparatus and an image processing method which can improve image quality when a pair of images formed to generate a difference corresponding to a parallax of both eyes are stereoscopically viewed, and a storage medium which realizes the processing method.

In order to achieve the above object, according to a first aspect of the invention, there is provided an image processing apparatus including a processing unit which, in a pair of images formed to generate a difference corresponding to a parallax of both eyes, performs a process of reducing a difference other than a geometric difference between image structures corresponding to the parallax of both eyes.

As a pair of images (a pair of images formed to generate a difference corresponding to a parallax of both eyes) according to the invention, images which are formed such that the same object is photographed by using a photographing means such as a camera at two points having an interval which is almost equal to or greater than an interval between both eyes of a person are cited. For example, the same scene is photographed by a plurality of image pickup devices, relative positions of which are adjusted to generate a difference corresponding to the parallax of both eyes to obtain digital images, or the same scene is photographed at positions such that a single image pickup device is sequentially moved to a plurality of positions to generate a difference corresponding to a parallax of both eyes to obtain digital images, and these digital images can be applied. However, images which are formed by CG (Computer Graphics) to generate a difference corresponding to a parallax of both eyes may also be applied. In addition, the pair of images may be still images picked from a pair of video images formed to generate a difference corresponding to a parallax of both eyes may also be applied.

The processing unit according to the first aspect of the invention performs processing which, in a pair of images formed to generate a difference corresponding to a parallax of both eyes, performs a process of reducing a difference other than a geometric difference between image structures corresponding to the parallax of both eyes. In this manner, in the pair of images formed to generate the difference corresponding to the parallax of both eyes, the difference other than the geometric difference between the image structures corresponding to the parallax of both eyes, i.e., a difference which is recognized as a conspicuous image quality defect when a pair of images are stereoscopically viewed, is reduced. For this reason, image quality obtained when a pair of images formed to generate a difference corresponding to the parallax of both eyes are stereoscopically viewed, is improved.

In the first aspect of the invention, as the difference other than the geometric difference between the image structures corresponding to the parallax of both eyes, for example, a difference between noise components superposed on a pair of images or a difference between colors in the pair of images is cited. The processing unit can be constituted to perform a process of reducing the difference between the superposed noise components or the difference between the colors. However, in many cases, the difference between the noise components or the colors in the pair of images cannot be easily recognized due to the adverse affect of the geometric difference between the image structures corresponding to the parallax of both eyes in the pair of images.

In consideration of the foregoing, according to the first aspect of the invention, for example, a recognition unit which recognizes a geometric difference between image structures corresponding to the parallax of both eyes in the pair of images is preferably arranged, and the processing unit is preferably constituted such that a process of reducing a difference other than the geometric difference between the image structures recognized by the recognition unit is performed in the pair of images.

In this case, more specifically, recognition of the geometric difference between the image structures by the recognition unit can be realized by matching, e.g., the pair of images. As this matching, for example, point pattern matching which obtains a pair of corresponding points on a pair of images, line pattern matching which obtains a pair of corresponding line segments on a pair of images, and the like can be applied. In this manner, a geometric difference between image structures corresponding to a parallax of both eyes in a pair of images can be recognized with high accuracy. The processing unit performs a process of reducing a difference other than the geometric difference between the image structures recognized by the recognition unit in the pair of images, based on a recognition result obtained by the recognition unit. For this reason, image quality obtained when a pair of images formed to generate a difference corresponding to a parallax of both eyes are stereoscopically viewed can be further improved.

According to the invention, a typical difference other than a geometric difference between image structures corresponding to a parallax of both eyes in a pair of images, there is cited, for example, a difference obtained by superposing noise components on the images. However, as the superposition of the noise components for generating a difference other than the geometric difference between the image structures, superposition of a noise component on only one of the pair of images, and superposition of different noise components on the pair of images are known. For example, in an aspect in which the same scene is photographed by a plurality of image pickup devices, relative positions of which are adjusted to generate a difference corresponding to a geometric difference between both eyes so as to generate a pair of images, if a pixel defect of a specific image pickup device, adhesion of dust to the incident optical system of the specific image pickup device, or the like occur, a noise component (often appearing as a clearly visible defective part) is superposed on only one image of the pair of images to generate a difference in the pair of images. When random noise is generated by the respective image pickup devices, noise components which are different from each other are superposed on the pair of images to generate a difference between the pair of images.

Thus, according to the first aspect of the invention, as the process of reducing the difference other than the geometric difference between image structures performed by the processing unit, more specifically, for example, there can be performed at least one (preferably both) of a process of removing a noise component superposed on only one of the pair of images from the one image (for example, a process of interpolating a part, on which a noise component is superposed, of the one image based on an image part surrounding the part) or a process of correcting at least one of the pair of images to eliminate or reduce a difference between noise components which are different from each other and superposed on corresponding regions on the pair of images. In this manner, a difference generated by superposition of a noise component in a pair of images can be reduced.

Considering the fact that a geometric difference between image structures in a pair of images occurs according to the invention, it is preferable that the processing unit, for example, divides the pair of images into sectional regions, determines a sectional region of the other image corresponding to a specific sectional region in the one image based on the geometric difference between image structures in the pair of images recognized by the recognition unit, and compares the sectional regions determined to be corresponding regions with each other for the respective sectional regions, so as to determine a noise component which causes the difference other than the geometric difference between the image structures. In this manner, a noise component (noise component superposed on only one image or noise components which are different from each other and superposed on corresponding regions on a pair of images) which causes a difference recognized as a conspicuous image quality defect in a pair of images according to the invention can be accurately determined.

When noise components which are different from each other are superposed on corresponding regions on a pair of images, the noise components may be removed from the pair of images, respectively. However, when the noise components are completely removed, the images may impart an unnatural impression. In consideration of the above, the processing unit, for example, preferably averages the noise components which are different from each other and are superposed on the corresponding regions on the pair of images, and at least one of the pair of images is preferably corrected based on the averaged noise component. In this manner, when the difference between the noise components superposed on the pair of images is reduced, image quality obtained when the pair of images are stereoscopically viewed can be improved, and the images can be prevented from giving an unnatural impression.

In an image processing method according to a second aspect of the invention, since a process is performed of reducing a difference other than a geometric difference between image structures corresponding to a parallax of both eyes in a pair of images formed to generate a difference corresponding to a parallax of both eyes, as in the first aspect, image quality obtained when the pair of images formed to generate a difference corresponding to the parallax of both eyes are stereoscopically viewed can be improved.

Since a storage medium according to a third aspect of the invention stores a program for causing a computer to function as a processing unit for performing, in a pair of images formed to generate a difference corresponding to a parallax of both eyes, a process of reducing a difference other than a geometric difference between image structures corresponding to the parallax of both eyes, the program is executed by the computer to enable the computer to function as an image processing apparatus according to the first aspect of the invention. Therefore, as in the first aspect of the invention, image quality obtained when a pair of images formed to generate a difference corresponding to a geometric difference between both eyes can be improved.

DETAILED DESCRIPTION OF THE INVENTION

Figure 1:
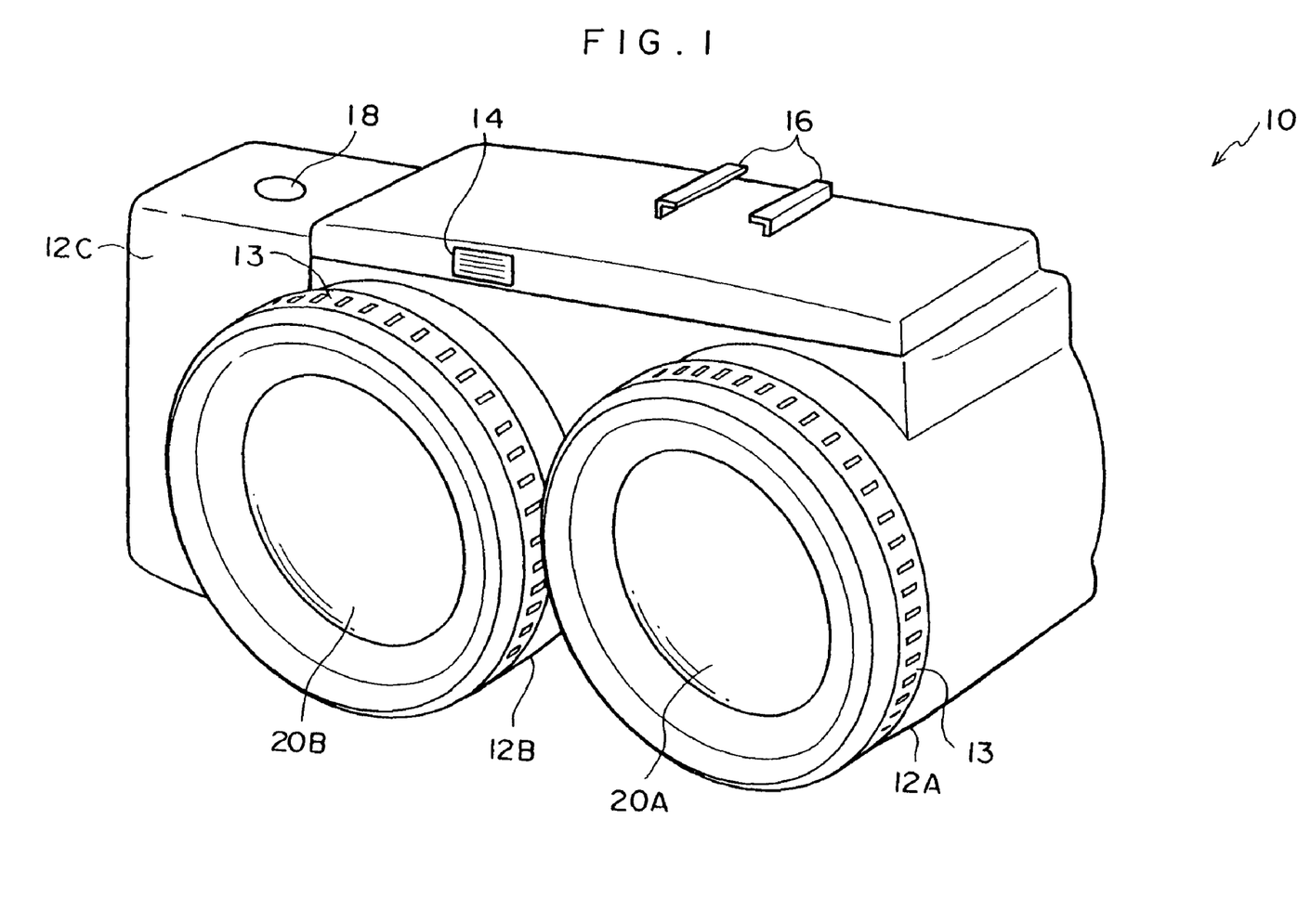
FIG. 1 is a perspective view showing an outward appearance of digital binocular glasses according to this embodiment.

An example of an embodiment of the present invention will be described below with reference to the accompanying drawings. FIG. 1 shows digital binocular glasses 10 having a function of an image processing apparatus according to the invention. In the digital binocular glasses 10, two housings 12A and 12B which are arranged such that the axis lines of the housings 12A and 12B are parallel to each other at an interval which is almost equal to an interval between the eyes of a person are connected to each other, and a projection (grip) 12C to facilitate easy grip of the main body is formed on the left side (when viewed from the front) of the main body. A mechanism (inter-eye distance adjustment mechanism) which can adjust an interval between the housings 12A and 12B may be arranged.

Above the housings 12A and 12B, an electronic flash 14 is fixed for emitting auxiliary light during photographing at low illumination intensity. A bracket 16 for fixing an independent electronic flash is formed on an upper surface of the main body of the digital binocular glasses 10. A shutter button 18 is disposed on an upper surface of the grip 12C. Although not shown, on a side surface of the grip 12C is a slot into which any one of various recording media such as a Smartmedia (R), a Compact Flash (R) card, and a Memory Stick (R) can be loaded.

The configurations of optical systems accommodated in the housings 12A and 12B and electric systems arranged for the optical systems will be sequentially described below. The optical systems accommodated in the housings 12A and 12B have the same configurations, and the electric circuits arranged for the optical systems have the same configurations. For this reason, the optical system and the electric system corresponding to the housing 12A, and the optical system and the electric system corresponding to the housing 12B will be described without making a distinction between the optical systems and the electric systems. However, as needed, reference symbol "A" is added to the constituent elements of the optical system and the electric system corresponding to the housing 12A, and reference symbol "B" is added to the constituent elements of the optical system and the electric system of the housing 12B to distinguish these systems.

Figure 2:
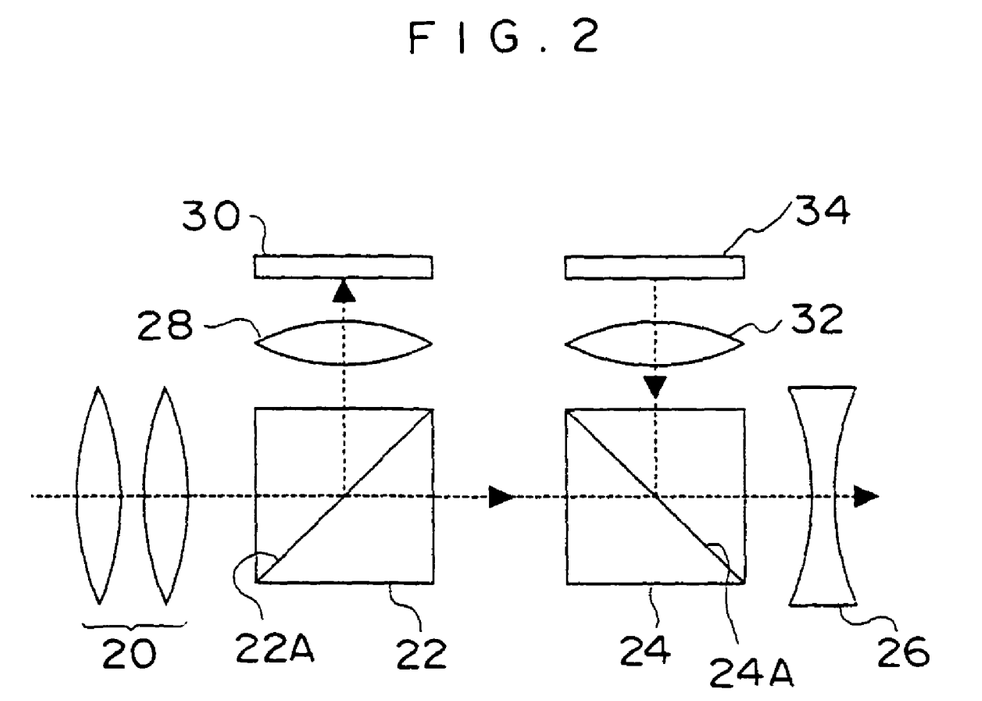
FIG. 2 is a schematic diagram of an optical system of the digital binocular glasses.

Object lenses 20A and 20B are fixed to the housings 12A and 12B to close the front openings of the housings, respectively. FIG. 2 shows the configuration of the optical system arranged in the housing 12A or 12B. Since the optical systems arranged in the housings 12A and 12B have the same configurations, only the optical system arranged in one of the housings 12A and 12B will be described. As shown in FIG. 2, more specifically, an object lens 20 is a zoom lens (variable focal length lens) composed of a plurality of lenses, and has an auto-focus (AF) function. The optical power (zoom power) of the object lens 20 can be adjusted by pivoting an operation ring 13 arranged on the peripheries of the housings 12A and 12B. A configuration which adjusts an optical power (zoom power) by the driving force of a motor may also be employed. As the object lens 20, a fixed focal length lens having only an AF function may be used.

A first prism 22, a second prism 24, and a eyepiece lens 26 are sequentially arranged on the light-radiating side of the object lens 20. In FIG. 2, the eyepiece lens 26 is shown as a single lens. However, in actuality, the eyepiece lens 26 is composed of a plurality of lenses, and left and right eyepiece lenses 26A and 26B have diopter adjustment mechanisms, respectively. A lens 28 and an image pickup device 30 constituted by an area CCD or the like are sequentially arranged at a downstream side in a radiating direction when light that is incident on the first prism 22 is radiated by a reflective surface 22A. The first prism 22 radiates the light that is incident thereto through the object lens 20 toward at least one of the image pickup device 30 or the second prism 24, and is configured such that rates of light radiated toward the image pickup device 30 and the second prism 24 can be changed.

Lens 32 and a display device 34 are sequentially arranged on a side of the second prism 24. As the display device 34, a display device which can display a color image at a predetermined luminance or more may be used. For example, the display device 34 can be constituted by a color LCD with backlight, an LED display obtained by arranging R, G, and B LEDs in a matrix, or the like.

The arrangement positions of the display device 34 and the lens 32 are adjusted such that, when light radiated from the display device 34 is incident on the second prism 24 through the lens 32 and reflected by a reflective surface 24A, the light is radiated toward the eyepiece lens 26. The second prism 24 radiates at least one of light from the display device 34 or light from the first prism 22 to the eyepiece lens 26, and is configured such that radiation rates of the light from the display device 34 and the light from the first prism 22 to the eyepiece lens 26 can be changed.

The eyepiece lens 26 is constituted by a convex lens, and a prism such as a polyprism is arranged between the object lens 20 and the first prism 22 or between the first prism 22 and the second prism 24, so that an interval between the optical axes of the object lenses 20A and 20B may be wider than the interval between the eyes (interocular distance) of a person. In this manner, when an optical image of an object formed by the object lens 20 and the eyepiece lens 26 is visually checked, the perspective of the object can be further improved.

Figure 3:
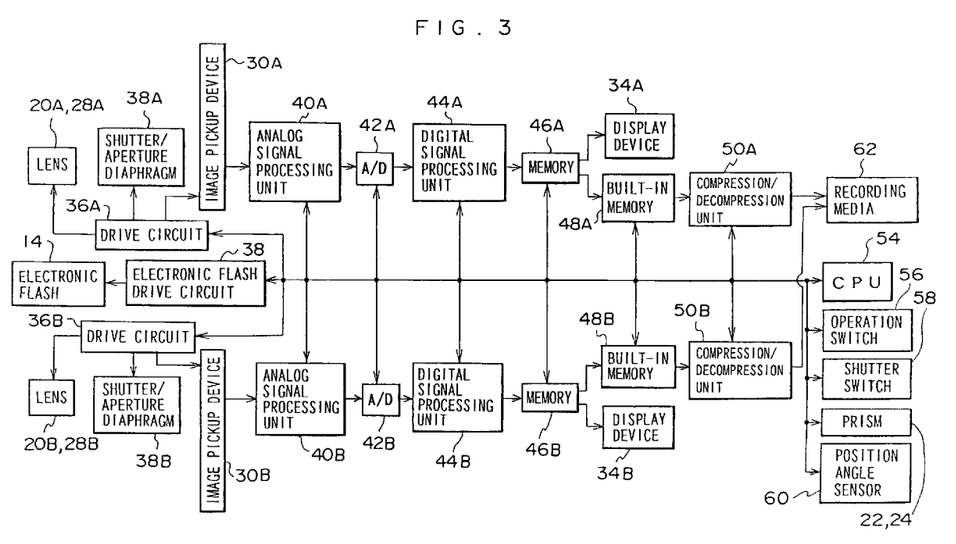
FIG. 3 is a schematic block diagram of an electric system of the digital binocular glasses.

The configuration of the electric system of the digital binocular glasses 10 will be described below with reference to FIG. 3. The digital binocular glasses 10 comprises a drive circuit 36. The AF function and the zoom function for the object lens 20 are driven by the drive circuit 36. The image pickup device 30 is arranged at a position corresponding to, more specifically, a focal point of the optical system consisting of the object lens 20 and the lens 28. When the first prism 22 is controlled in such a state that incident light is partially or fully reflected to the image pickup device 30 side, the light which is reflected by the object and which is incident on the object lens 20 is reflected by the reflective surface 22A of the first prism 22 to form an image of the object on the light-receiving surface of the image pickup device 30 through the lens 28. The image pickup device 30 is driven at a timing synchronized with a timing signal generated by a timing generation circuit (not shown) built in the drive circuit 36, and image signals (signals representing amounts of received light in a large number of photoelectric converting cells arranged in a matrix on the light-receiving surface) are output at a predetermined cycle.

Shutter/aperture diaphragms 38A and 38B are arranged between the lens 28 and the image pickup device 30. Both the shutter and the aperture diaphragm are driven by the drive circuit 36. The shutter is arranged to prevent a smear from being formed by causing light to be incident on the light-receiving surface of the image pickup device 30 when image signals are output from the image pickup device 30. The shutter can be omitted depending on the configuration of the image pickup device 30. In addition, the aperture diaphragm may be constituted by a single aperture diaphragm which can continuously change a numerical aperture, or may be obtained such that a plurality of aperture diaphragms having different numerical apertures are switched.

The digital binocular glasses 10 comprises an electronic flash drive circuit 38. The electronic flash drive circuit 38 is connected to the electronic flash 14. The electronic flash 14 flashed when low illumination intensity is detected or when the user designates the electronic flash to flash.

An analog signal processing unit 40, an A/D converter 42, a digital signal processing unit 44, a memory 46, and a built-in memory 48 are sequentially connected to the signal output terminal of the image pickup device 30. The analog signal processing unit 40 amplifies an image signal output from the image pickup device 30, and corrects the white balance or the like of the amplified image signal. The image signal output from the analog signal processing unit 40 is converted into digital image data by the A/D converter 42, and the digital image data is input to the digital signal processing unit 44. In the digital signal processing unit 44, various processes such as color correction, γ correction process, and Y/C conversion are performed on the input image data. The image data output from the digital signal processing unit 44 is temporarily stored in the memory 46 constituted by a RAM or the like.

The built-in memory 48 constituted by a FIFO (First In First Out) memory and having a storage capacity which can store image data of a plurality of frames is connected to the memory 46. While light from the object is incident on the image pickup device 30 through the object lens 20, the first prism 22, and the lens 28, image signals are output from the image pickup device 30 at a predetermined cycle. For this reason, image data is input to the memory 46 at a predetermined cycle, the image data temporarily stored in the memory 46 is updated at a predetermined cycle, and the image data temporarily stored in the memory 46 is sequentially stored in the built-in memory 48. Therefore, the latest image data of a plurality of frames is always stored in the built-in memory 48.

The display device 34 is also connected to the memory 46. A signal processing circuit for converting the input image data into a display control signal for displaying an image expressed by the image data on the display device 34, and a drive circuit that drives the display device 34 depending on the display control signal generated by the signal processing circuit to display the image expressed by the input image data on the display device 34, are added to the display device 34. The image data stored in the memory 46 are also output to the display device 34 and are displayed on the display device 34 as an image (video image).

The drive circuit 36, the electronic flash drive circuit 38, the analog signal processing unit 40, the A/D converter 42, the digital signal processing unit 44, the memory 46, the built-in memory 48, and a compression/decompression unit 50 (to be described later) are connected to a bus 52. A CPU 54 is connected to the bus 52. Although not shown, the CPU 54 includes peripheral circuits such as a ROM, a RAM, a non-volatile memory (memory of which the storage contents can be rewritten: for example, EEPROM or the like), and an input/output port. In the ROM, a noise reduction program for performing a noise reducing process (will be described later) is written in advance. This noise reducing program corresponds to a program according to the invention.

An operation switch 56 constituted by various switches (e.g., a power switch, an operation mode changeover switch, and the like: not shown in FIG. 1), a shutter switch 58 which is turned on or off by an operation of the shutter button 18, and an position angle sensor 60, constituted by a gyro sensor, for detecting a change in position angle of the digital binocular glasses 10 are connected to the bus 52. The first prism 22 and the second prism 24 are also connected to the bus 52. Radiation rates of light from the first prism 22 and light from the second prism 24 are controlled by the CPU 54.

A recording medium 62 loaded in the slot is connected to compression/decompression units 50A and 50B. When the shutter button 18 is operated to turn on the shutter switch 58, and when image data is designated to be written in the recording medium 62 loaded in the slot, the CPU 54 reads the image data from built-in memories 48A and 48B and transfers the image data to the compression/decompression units 50A and 50B. In this manner, the image data transferred to the compression/decompression units 50A and 50B is compressed by the compression/decompression units 50A and 50B, and is then written in the recording medium 62 as an image file of a predetermined format (e.g., EXIF format).

The number of pixels of the image data written in the recording medium 62 changes depending on a setting of the number of recording pixels, and a compression ratio of the image data also changes depending on a mode which is set in advance as an image quality mode. Depending on the image quality mode, the image data may be written in the recording medium 62 without being compressed.

When the image expressed by the image data stored in the recording medium 62 loaded in the slot is designated to be reproduced (displayed), the image data is read from the recording medium 62. When the read image data is image data which had been compressed and stored, the compressed image data is expanded (decompressed) by the compression/decompression units 50A and 50B and then transferred to memories 46A and 46B. An image is displayed (reproduced) on display devices 34A and 34B by using the image data temporarily stored in the memories 46A and 46B.

The operation of this embodiment will be described below. In the digital binocular glasses 10 according to this embodiment, the following operation modes are set: an optical image visual check mode for visually checking an optical image of an object formed by the object lens 20 and the eyepiece lens 26, a photographed image visual check mode for visually checking an image photographed by the image pickup device 30 and displayed on the display device 34, and a synthesized image visual check mode for visually checking an image obtained by synthesizing the images displayed on the display devices 34A and 34B with the optical image of the object formed by the object lens 20 and the eyepiece lens 26. These operation modes can be selected by the user by operating an operation mode changeover switch (not shown) arranged on the main body of the digital binocular glasses 10.

When the optical image visual check mode is selected as the operation mode, the CPU 54 changes the radiation rate of the light from the first prism 22 such that light that is incident on the first prism 22 is radiated onto only the second prism 24 side through the object lens 20, and a radiation rate of the light from the second prism 24 is changed such that only light that is incident from the first prism 22 on the second prism 24 is radiated onto the eyepiece lens 26. In this manner, like conventional binocular glasses, the optical image of the object formed by the object lens 20 and the eyepiece lens 26 is visually recognized (stereoscopically viewed) by the user who looks into the eyepiece lenses 26A and 26B with both eyes.

In the optical image visual check mode, when the user pivots the operation ring 13, the optical power (zoom power) of the object lens 20 can also be adjusted. Focus adjustment in the optical image visual check mode may be performed, for example, with a focus adjustment function such that the focus adjustment mechanism can be operated by the user. However, the focus adjustment may also be performed automatically as follows: the radiation rate of light from the first prism 22 is changed such that light that is incident on the first prism 22 through the object lens 20 is also radiated toward the image pickup device 30 side, and the AF functions of the object lenses 20A and 20B are driven through drive circuits 36A and 36B based on an image obtained by photographing performed by the image pickup device 30 (for example, the degree of sharpness of the image is calculated, and the AF functions are driven such that the degree of sharpness is maximum).

When the photographed image visual check mode is selected as the operation mode, the CPU 54 changes the radiation rate of light from the first prism 22 such that light that is incident on the first prism 22 is radiated toward only the image pickup device 30 side through the object lens 20, and changes the radiation rate of the light from the second prism 24 such that only light that is incident from the display device 34 on the second prism 24 is radiated toward the eyepiece lens 26. Furthermore, an image obtained by photographing performed by the image pickup device 30A is displayed on the display device 34A, and an image obtained by photographing performed by the image pickup device 30B is displayed on the display device 34B.

In this manner, the images displayed on the display devices 34A and 34B are visually recognized by the user who looks into the eyepiece lenses 26A and 26B with both eyes. Since the image pickup devices 30A and 30B photoelectrically convert light that is incident from an object through the object lenses 20A and 20C having optical axes arranged at an interval which is almost equal to an interval between both eyes of a person, a pair of images obtained by photographing performed by the image pickup devices 30A and 30B have a geometric difference between image structures corresponding to at least a parallax of both eyes (stereoscopic image). Therefore, the object can be stereoscopically recognized by the user who visually recognizes the pair of images displayed on the display devices 34A and 34B with both eyes through the eyepiece lenses 26A and 26B (a so-called "stereoscopic vision")

As in the photographed image visual check mode, while photographing is performed by the image pickup devices 30A and 30B, image processing (to be described below) is performed in the digital binocular glasses 10.

More specifically, the sensitivity characteristics (incident light amount-output characteristics) of the image pickup devices 30A and 30B mounted on the digital binocular glasses 10 are measured in advance in units of pixels, and correction data for correcting image data input from A/D converters 42A and 42B into image data which is equal to image data obtained by image pickup operations of a pair of image pickup devices having uniform sensitivity characteristics is set in units of pixels of the image pickup devices 30A and 30B. The correction data is stored in digital signal processing units 44A and 44B. The digital signal processing units 44A and 44B correct the image data in units of pixels based on the stored correction data. In this manner, the variations of the sensitivity characteristics of the image pickup devices 30A and 30B can be corrected.

Since images (video images) obtained by correcting the sensitivity characteristics of the image pickup devices 30A and 30B are displayed on the display devices 34A and 34B, the variations of the sensitivity characteristics of the image pickup devices 30A and 30B can be prevented from being recognized as conspicuous image quality defects by the user who visually recognizes the pair of images displayed on the display devices 34A and 34B through the eyepiece lenses 26A and 26B with both eyes.

In the digital binocular glasses 10 according to this embodiment, image data corresponding to predetermined-size sectional regions of the images expressed by the image data is cut from the image data input from the A/D converters 42A and 42B by the digital signal processing units 44A and 44B, so that the image data in the sectional regions are used for display or the like of the images on the display devices 34A and 34B. While photographing is performed by the image pickup devices 30A and 30B, the CPU 54 monitors a change in position angle of the digital binocular glasses 10 detected by the position angle sensor 60. When the position angle of the digital binocular glasses 10 changes, newly cut positions of sectional regions are calculated depending on the change in position angle of the digital binocular glasses 10 such that photographing areas corresponding to the sectional regions is suppressed from being changed regardless of a change of an entire photographing area by the image pickup devices 30A and 30B depending on the change in attitude of the digital binocular glasses 10. The calculated cut positions are repeatedly notified to the digital signal processing units 44A and 44B.

The digital signal processing units 44A and 44B cut image data corresponding to the sectional regions from the image data depending on the cut positions notified by the CPU 54, such that the positions of the sectional regions change on the image expressed by the image data input from the A/D converter 42. In this manner, even when the entire photographing area obtained by the image pickup devices 30A and 30B temporarily changes due to hand movement or the like of the user who grips the digital binocular glasses 10, photographing ranges corresponding to the sectional regions can be suppressed from being changed. Since the images (video images) subjected to the hand-movement correction are displayed on the display devices 34A and 34B, the image visually recognized by the user through the eyepiece lenses 26A and 26B can be prevented from being visually undesirable by change of the photographing regions caused by hand movement or the like of the user.

While photographing is performed by the image pickup devices 30A and 30B, the CPU 54 executes a noise reduction program written in the ROM to perform a noise reduction process to images (data) stored in the memories 46A and 46B through various processes in the digital signal processing units 44A and 44B. The noise reduction process will be described below with reference to the flow chart of FIG. 4.

Figure 4:
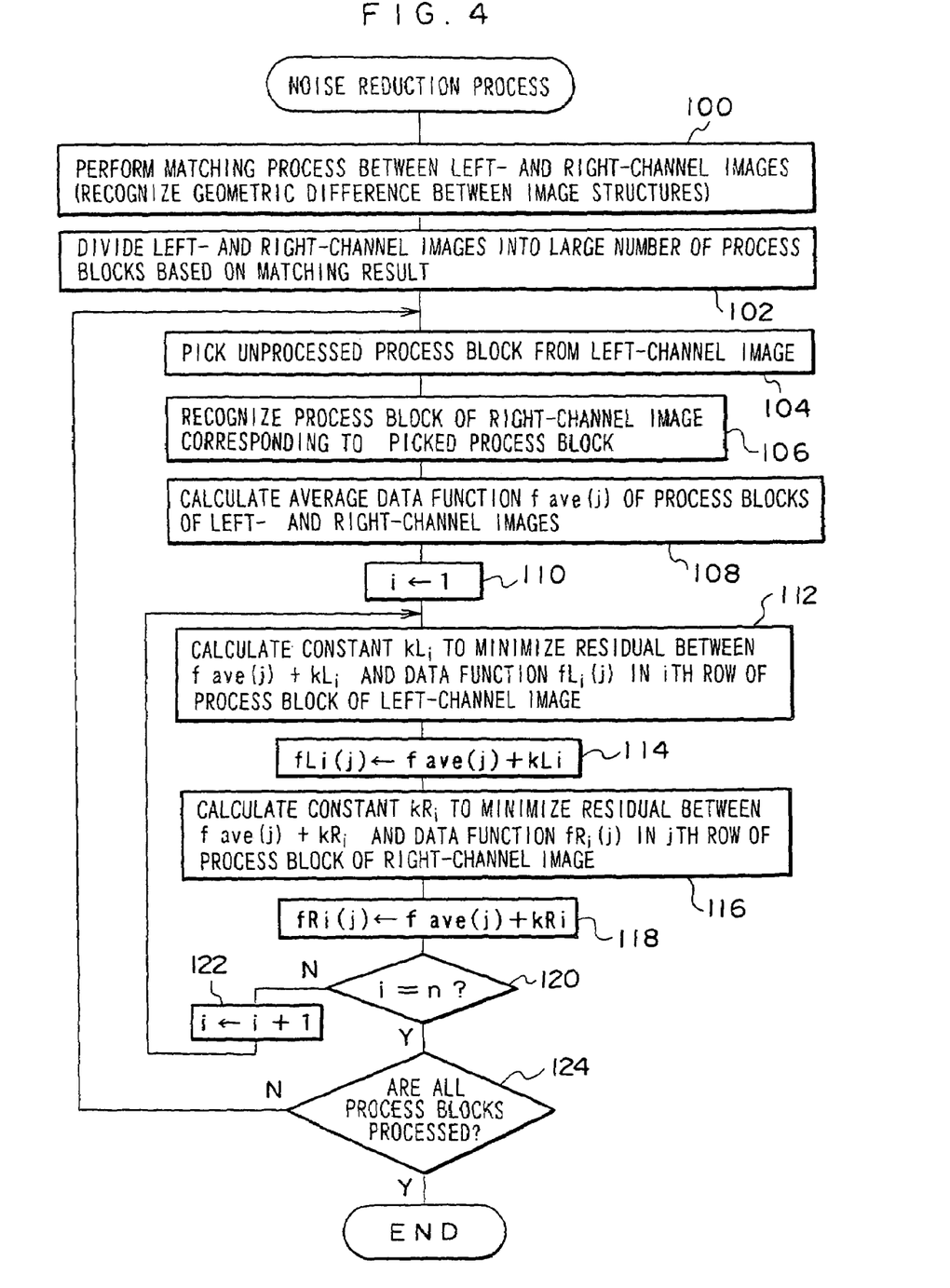
FIG. 4 is a flow chart showing the contents of a noise reduction process.

This noise reduction process is a process to which the image processing method according to the invention is applied. The CPU 54 for executing the noise reduction program functions as an image processing apparatus according to the invention. For descriptive convenience, an image stored in the memory 46A will be called a left-channel image, and image stored in the memory 46B will be called a right-channel image. The images of the left and right channels correspond to digital images obtained by photographing the same scene by a plurality of image pickup devices, relative positions of which are adjusted to generate a difference corresponding to a parallax of both eyes according to the present invention.

In step 100, in order to recognize a geometric difference between image structures of the left-channel image and the right-channel image, a matching process of the left- and right-channel images is performed. As the matching process, for example, candidates (corresponding point candidates) which may be corresponding points in the left- and right-channel images are extracted from the left- and right-channel images, and the corresponding points are determined by a relaxing method.

More specifically, as the corresponding point candidates, points at which density levels largely change in all the directions are desirably used. When the corresponding point candidates exist at a high density, the corresponding points cannot be easily determined. For this reason, variations g'1, g'2, g'3, and g'4 of density levels in horizontal, vertical, right oblique, and left oblique directions with respect to the pixels of an image g (x, y) from which the corresponding point candidates are extracted are calculated by the following equations:

$$g'1(x,y)=[2 \cdot g(x,y)-(g(x-1,y))+g(x+1,y))]2$$

$$g'2(x,y)=[2 \cdot g(x,y)-(g(x,y-1))+g(x,y+1))]2$$

$$g'3(x,y)=[2 \cdot g(x,y)-(g(x+1,y-1))+g(x-1,y+1))]2$$

$$g'4(x,y)=[2 \cdot g(x,y)-(g(x-1,y-1))+g(x+1,y+1))]2$$

While a window W having a proper size is moved one pixel at a time, an operator output value g" given by the following equation is calculated as a value of the center pixel (x, y) of the window.

$$g''(x, y) = \min_i \left[ \sum_{(x,y) \in W} g'i(x, y) \right] \quad i = 1, 2, 3, 4 \quad \text{[Equation 1]}$$

Figure 5A:
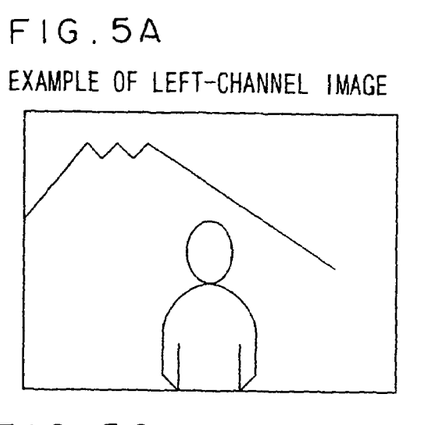
FIGS. 5A to 5E are image diagrams for explaining a matching process of images of left and right channels.
Figure 5B:
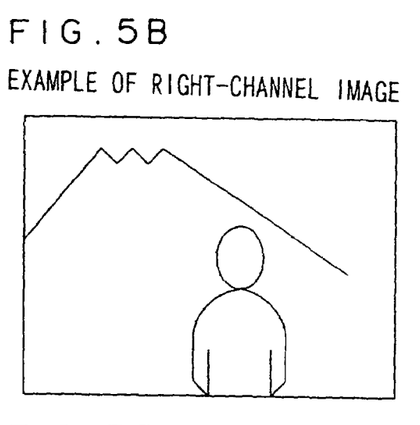
Figure 5C:
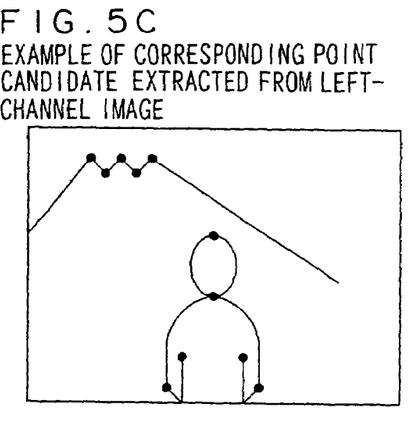
Figure 5D:
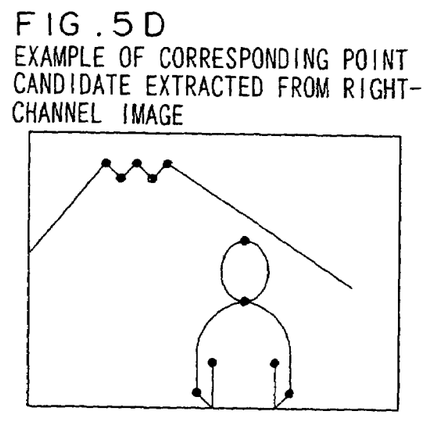

Subsequently, maximum values g* of operator output values g" are extracted from local regions having sizes corresponding to (2w+1)×(2w+1) pixels arranged around the pixel (x, y). From the maximum values g* in the image, n pixels having larger values g* are sequentially extracted. The pixels are determined as the corresponding point candidates. When the above process is performed on the left- and right-channel images, a corresponding point candidate as shown in FIG. 5C is extracted as an example from the left-channel image shown in, e.g., FIG. 5A, and a corresponding point candidate as shown in FIG. 5D is extracted as an example from the right-channel image shown in, e.g., FIG. 5B.

Corresponding points are determined based on the extracted corresponding point candidates. A set of corresponding point candidates extracted from the left-channel image is represented by L=[$L_1, L_2, \ldots, L_n$], and a set of corresponding point candidates extracted from the right-channel image is represented by R=[$R_1, R_2, \ldots, R_n$]. With respect to corresponding point candidates $L_i$ (i=1, 2, ..., n) extracted from the left-channel image, corresponding point candidates $R_j$ of the right-channel existing in a rectangular region having a size corresponding to (2r+1)×(2r+1) pixels around $L_i$ are determined as corresponding point pair candidates. In this case, a vector having a start point $L_i$ and an end point $R_j$ will be called a difference vector.

Figure 5E:
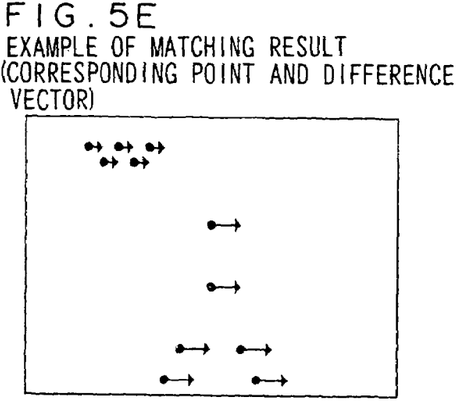

The corresponding points are determined by narrowing down the corresponding point candidates such that the corresponding point pair candidates (difference vector candidates) obtained for the corresponding point candidates $L_i$ does not contradict the corresponding point pair candidates (difference vector candidates) obtained for a corresponding point candidates $L_j$ (i≠j). More specifically, a relaxing method (a label λk is given to the target $L_i$ to reduce local contradiction), and components Δx and Δy of the difference vectors in x and y directions are used as the label λk, so that the corresponding points can be determined. In this manner, a matching result (corresponding point pairs and difference vectors) as shown in FIG. 5E are obtained, and a geometric difference between image structures of the left-channel image and the right-channel image can be recognized. The step 100 described above corresponds to a recognition unit according to the present invention.

In step 102 and subsequent steps, a process of reducing a difference other than a geometric difference between image structures in the left- and right-channel images is performed. The processes in step 102 and subsequent steps correspond to a processing unit according to the invention (more specifically, an image processing unit for performing a "process of correcting at least one of one pair of images such that a difference between noise components which are different from each other and which are superposed on corresponding regions on the pair of images are eliminated or reduced").

More specifically, in step 102, based on the result of the matching process in step 100, by using positions (e.g., positions where corresponding point pairs exist) corresponding to each other in the left- and right-channel images as a boundary, the left- and right-channel images are divided into a large number of process blocks. The division into the large number of process blocks may be performed such that, when a process block of one of the left- and right-channel images corresponds to a process block of the other of the left- and right-channel images, these process blocks can be discriminated from each other. Other dividing methods may also be applied. In addition, the shapes of the process blocks are not limited to rectangles. The process blocks correspond to sectional regions according to the invention.

In step 104, data of an unprocessed process block is picked from the left-channel image. In the next step 106, a process block of the right-channel image corresponding to the process block (: process block L) is recognized, and data of the recognized process block (: process block R) is picked. In step 108, based on the data of the process blocks L and R picked from the left- and right-channel images, by using all pixel strings j (j=1, 2, . . . , jmax) in the process blocks L and R as targets, average data functions f ave(j) of the left- and right-channel images are calculated by the following equation:

$$f\ ave(j) = \frac{1}{2n} \cdot \left( \sum_{i=1}^{n} data_L(i,j) + \sum_{i=1}^{n} data_R(i,j) \right) \quad \text{[Equation 2]}$$

where, $data_L$ (i, j): pixel at the ith row and the jth column in the process block L, $data_R$ (i, j): pixel at the ith row and the jth column in the process block R, and n: the total number of pixels in the process blocks L and R.

Since the average data function f ave(j) is a data function corresponding to an average of the left- and right-channel images, random noises superposed on corresponding regions on the left- and right-channel images are averaged. Therefore, the average data function f ave(j) corresponds to an averaged noise component according to the present invention.

In step 110, 1 is substituted for a variable i. In step 112, when a data function of the ith row is expressed by:

$fL_i(j) = data_L(i,j)$, a constant $kL_i$ obtained when a residual between the data function $fL_i(j)$ and the function f ave(j)+$kL_i$ is minimum is calculated by the least-squares method. In step 114, the data function of the ith row in the process block L is set by the following expression:

$fL_i(j) \leftarrow f\ ave(j)+kL_i$

In step 116, when a data function of the ith row in the process block R is expressed by:

$fR_i(j) = data_R(i,j)$, a constant $kR_i$ obtained when a residual between the data function $fR_i(j)$ and the function f ave(j)+$kR_i$ is minimum is calculated by the least-squares method. In step 118, the data function of the ith row in the process block R is set by the following expression:

$fR_i(j) \leftarrow f\ ave(j)+kR_i$

In the next step 120, it is checked whether the variable i is equal to the total number n of rows of pixels in the process blocks L and R. When it is determined NO in step 120, the CPU 54 shifts to step 122 to increment the variable i, and returns to step 122. In this manner, with respect to the rows of all the pixels in the process blocks L and R picked in steps 104 and 106, the processes in step 112 to step 118 are performed.

When it is determined YES in step 120, the CPU 54 shifts to step 124 to check whether the processes in step 104 and subsequent steps are performed on all the process blocks in the left- and right-channel images. When it is determined NO in step 124, the CPU 54 returns to step 104. In this manner, the processes in step 104 and subsequent steps are performed on all the process blocks in the left- and right-channel images. When it is determined YES in step 124, the noise reduction process is ended.

In the noise reduction process, since the left- and right-channel images are corrected based on the same average data function f ave(j), in the left- and right-channel images, a difference other than a geometric difference between image structures recognized in step 100, more specifically, a difference between random noises superposed on the left- and right-channel images and generated by the image pickup devices 30A and 30B or the like is reduced. In the above description, as the average data function f ave(j), the data function corresponding to an average of the left- and right-channel images is used. However, in place of this, a data function corresponding to an average of one of the left- and right-channel images may also be used.

The noise reduction process is performed on the image data input and stored in the memory 46 at a predetermined cycle, and the images (video images) subjected to the noise reduction process are displayed on the display devices 34A and 34B. This presents random noises superposed on the left- and right-channel images from being recognized as a conspicuous image quality defect by the user who visually checks the pair of images displayed on the display devices 34A and 34B with both eyes through the eyepiece lenses 26A and 26B.

In the photographed image visual check mode, when the user who visually checks video images displayed on the display devices 34A and 34B with both eyes through the eyepiece lenses 26A and 26B wishes to store an image which is being visually checked as a still image, the shutter button 18 is operated to designate the image data to be written in the recording medium 62 loaded in the slot. When the CPU 54 detects that the shutter button 18 is operated by turning on the shutter switch 58, the CPU 54 reads the image data from the built-in memories 48A and 48B to transfer the image data to the compression/decompression units 50A and 50B.

More specifically, taking into consideration that some amount of time is required until turning on of the shutter switch 58 is detected to read image data after the shutter button 18 is operated, the CPU 54 reads image data picked prior to the time difference to transfer the image data to the compression/decompression units 50A and 50B in reading the image data from the built-in memories 48A and 48B by using the latest stored image data of a plurality of frames in the built-in memories 48A and 48B. In this manner, the image data picked at a timing which is almost equal to the timing at which the shutter button 18 is operated can be written in the recording medium 62.

On the other hand, when the synthesized image visual check mode is selected as the operation mode, the CPU 54 changes a radiation rate of the light from the first prism 22 such that light that is incident on the first prism 22 through the object lens 20 is radiated toward the second prism 24 and the image pickup device 30 at predetermined radiation rates. The CPU 54 changes the radiation rate of the light from the second prism 24 such that light that is incident from the first prism 22 onto the second prism 24 and light that is incident from the display device 34 onto the second prism 24 are radiated to the eyepiece lens 26 at predetermined radiation rates, and displays these images on the display devices 34A and 34B, respectively. In this manner, a synthesized image obtained by synthesizing the optical image of the object formed by the object lens 20 and the eyepiece lens 26, and the images displayed on the display devices 34A and 34B is visually checked (stereoscopically checked) by the user who looks into the eyepiece lenses 26A and 26B with both eyes.

In the synthesized image visual check mode, the display devices 34A and 34B can display arbitrary images. For example, images obtained by image pickup operations performed by the image pickup devices 30A and 30B are analyzed to recognize moving defects in the images, the recognized moving objects or the like are indicated, or graphics for emphasizing the moving objects are generated to be displayed on the display devices 34A and 34B, so that an image obtained by synthesizing the optical image of the object and the graphics may be visually recognized by the user.

In this embodiment, in order to avoid a positional error between the optical image of the object formed by the object lens 20 and the eyepiece lens 26 and the images displayed on the display devices 34A and 34B, the hand-movement correction (hand-movement correction caused by changing cut positions of sectional regions) is stopped, or a prism such as a variangle prism, the angle of which can be changed, is arranged on an optical path which is close to the object rather than the first prism 22 in place of the above hand-movement correction system, and, based on a change in position angle of the digital binocular glasses 10 detected by the position angle sensor 60, the optical axis of the prism is controlled to cancel the change in position angle, so that hand-movement correction is preferably performed.

In the synthesized image visual check mode, as an image to be synthesized with the optical image of the object, for example, an image in a virtual world (virtual reality image) generated by using a technique such as CG (Computer Graphics) may be used. This virtual reality image may be stored as image data in the digital binocular glasses 10 in advance. However, a function which communicates with an external circuit (e.g., the Internet or the like) through a communication unit including a wireless system or the like is mounted on the digital binocular glasses 10, and the image data may be received from a server connected to the Internet. As described above, when an image (image generated without using the images obtained by image pickup operations performed by the image pickup devices 30A and 30B) synthesized with the optical image is not related to the object, image pickup operations need not be performed by the image pickup devices 30A and 30B. For this reason, a radiation rate of the light from the first prism 22 may be changed such that light that is incident on the first prism 22 through the object lens 20 is radiated toward only the second prism 24. In addition, based on the images obtained by image pickup operations performed by the image pickup devices 30A and 30B or a detection result obtained by the position angle sensor 60, a change in a position angle (line of sight) of the digital binocular glasses 10 is recognized. Depending on the recognized change in position angle (line of sight), a virtual reality image to be displayed on the display device 34 may be changed. The image to be synthesized with the optical image may be a character image or the like.

As described above, in the digital binocular glasses 10 according to this embodiment, various images (optical images) are shown to the user depending on an operation mode selected by the user. For this reason, convenience can be improved for the user.

As a process of reducing a difference between random noises superposed on corresponding regions on the left- and right-channel images, the process using the average data function f ave(j) has been described above. However, the process is not limited to the process using the function, and the following process may also be applied. That is, random noise components superposed on left- and right-channel images are extracted, the extracted noise components are averaged, and the averaged noise component is added to the left- and right-channel images from which the extracted noise components are removed, so that the difference between the random noise components may be canceled. In addition, in place of the averaged noise component, a noise component extracted from one of the left- and right-channel images may also be applied.

As an example of image processing performed by the image processing unit according to the invention, a process (nose reducing process) for reducing a difference between random noises (noise components which are different from each other and which are superposed on corresponding regions on a pair of images) superposed on corresponding regions on left- and right-channel images has been described above. The image processing is not limited to the noise reduction process. That is, a noise component removing process which removes a noise component superposed on only one of the left- and right-channel images from one of the images may be additionally performed. For example, when high-performance image pickup devices with low noise are used as the image pickup devices 30A and 30B, only the noise component removing process may be performed.

As the noise component removing process, the following process or the like may be applied. That is, after a matching process between left- and right-channel images is performed to recognize a geometric difference between image structures of the left- and right-channel images, corresponding regions of the left- and right-channel images are compared with each other. When it is detected that one of the images has a defective part having a scale which is equal to the scale of a defective part formed on an image when dust or the like is adhered to the object lens 20, interpolation is performed based on the image part surrounding the detected defective part, or the defective part is buried with the data of a corresponding image part of the other image, so that the detected defective part is removed.

The case in which a noise reduction process according to the invention is executed by the CPU 54 has been described above. However, the invention is not limited to the case. Dedicated hardware for executing a noise reduction process may be arranged to execute the noise reduction process, thereby reducing a load on the CPU 54.

Furthermore, in the above explanation, a noise reduction program according to the invention is written beforehand in the ROM of the digital binocular glasses 10, the CPU 54 of the digital binocular glasses 10 executes a noise reduction program to realize the noise reduction process to which the image processing method according to the invention is applied, and the CPU 54 of the digital binocular glasses 10 functions as the image processing apparatus according to the invention. However, the invention is not limited to this example. For example, a program according to the invention may be written in a recording medium such as a CD-ROM, a DVD, or an FD in advance, the recording medium is set in a computer such as a personal computer to install the program, and the program according to the invention is executed by the computer, so that the image processing to which the image processing method according to the invention is applied may be realized. In this embodiment, the computer functions as the image processing apparatus according to the invention. The program according to the invention can also be distributed through a communication network such as the Internet.

In the embodiment in which the computer functions as the image processing apparatus according to the invention, the image processing to which the image processing method according to the invention is applied can be executed by using an arbitrary image which can be captured by the computer. For this reason, a DSC is sequentially moved to a plurality of positions at which a difference corresponding to a parallax of both eyes, and a plurality of images obtained by photographing the same scene at the respective positions are used as targets, so that the image processing to which the image processing method according to the invention is applied can also be executed.

What is claimed is:

1. An image processing method comprising:
    using a computer to perform a process of:
        reducing a difference of at least one of a pair of images corresponding to a parallax of both eyes, said difference is other than a geometric difference between image structures corresponding to said parallax of both eyes;
        wherein the difference other than the geometric difference between the image structures corresponding to the parallax of both eyes is a difference between noise components superposed on the selected pair of images; and
        wherein the reducing a difference comprises using a least-squares method, the least-squares method determining a minimizing constant that minimizes a residual between (1) an average data function plus a constant and (2) a data function over a region of one of the selected pair of images, and setting each pixel in said region to have the value of the average data function at said each pixel plus the minimizing constant;
        wherein said average function is determined based on the selected pair of images.

2. An image processing method according to claim 1, wherein the reducing difference between noise components superposed on the selected pair of images comprises:
    determining an averaged noise component for the selected pair of images; and
    correcting the noise component in each image of the selected pair of images according to the averaged noise component.

3. An image processing method according to claim 1, wherein the difference other than the geometric difference between the image structures corresponding to the parallax of both eyes is a difference between colors in the selected pair of images.

4. An image processing apparatus comprising:
    one or more storage units for storing pairs of images formed to generate a difference corresponding to a parallax of both eyes;
    a processing unit coupled to said one or more storage units which, in a selected pair of images stored in said storage units, performs a process of reducing a difference of at least one of the selected pair of images other than a geometric difference between image structures corresponding to the parallax of both eyes;
    wherein the difference other than the geometric difference between the image structures corresponding to the parallax of both eyes is a difference between noise components superposed on the selected pair of images; and
    wherein the reducing a difference between noise components comprises using a least-squares method, the least-squares method determining a minimizing constant that minimizes a residual between (1) an average data function plus a constant and (2) a data function over a region of one of the selected pair of images, and selling each pixel in said region to have the value of the average data function at said each pixel plus the minimizing constant;
        wherein said average function is determined based on the selected pair of images.

5. An image processing apparatus according to claim 4, wherein the selected pair of images are still images picked from a pair of video images formed to generate a difference corresponding to a parallax of both eyes.

6. An image processing apparatus according to claim 4, further comprising a recognition unit which recognizes the geometric difference between image structures corresponding to the parallax of both eyes in the selected pair of images, wherein
    the processing unit performs a process of reducing a difference other than the geometric difference between the image structures recognized by the recognition unit in the selected pair of images.

7. An image processing apparatus according to claim 6, wherein the recognition unit recognizes the geometric difference between the image structures corresponding to the parallax of both eyes by performing matching between the selected pair of images.

8. An image processing apparatus according to claim 6, wherein the processing unit divides each of the selected pair of images into sectional regions, determines, for a specific sectional region of one of the selected pair of images, a corresponding sectional region of the other image in the selected pair based on the geometric difference between image structures in the selected pair of images recognized by the recognition unit, and compares the two corresponding sectional regions with each other, so that a noise component which causes the difference other than the geometric difference between the image structures is determined.

9. An image processing apparatus according to claim 4, wherein the processing unit performs, as the process of reducing the difference other than the geometric difference between the image structures, at least one of a process of removing a noise component superposed on only one of the selected pair of images from the one image or a process of correcting at least one of the selected pair of images to eliminate or reduce a difference between noise components which are different from each other and superposed on corresponding regions on the selected pair of images.

10. An image processing apparatus according to claim 9, wherein the processing unit averages the noise components which are different from each other and superposed on the corresponding regions on the selected pair of images, and corrects at least one of the selected pair of images based on the averaged noise component.

11. An image processing apparatus according to claim 4, wherein the selected pair of images are digital images obtained by photographing the same scene by a plurality of image pickup devices, relative positions of which are adjusted to generate the difference corresponding to a parallax of both eyes, or by photographing the same scene at a plurality of positions to which a single image pickup device is sequentially moved to generate the difference corresponding to a parallax of both eyes.

12. An image processing apparatus according to claim 4, wherein the reducing a difference reduces a difference between image structures corresponding to the parallax of both eyes which is not a geometric difference.

13. An image processing apparatus according to claim 4, wherein the reducing difference between noise components superposed on the selected pair of images comprises:
   determining an averaged noise component for the selected pair of images; and
   correcting the noise component in each image of the selected pair of images according to the averaged noise component.

14. An image processing apparatus according to claim 4, wherein the selected pair of images comprises a left image and a right image, and the process for reducing the difference of at least one of the pair of images further comprises:
   sectioning each of the left image and the right image into a plurality of process blocks, wherein each process block of the left image correspond to a process block of the right image, and each process block for the left image and each process block for the right image comprising a plurality of pixels;
   for each pair of corresponding process blocks, perform the following operations:
   calculating an average data function based on the left process block and the right process block;
   calculating a left minimizing constant and a right minimizing constant using a least squares method that minimizes a left residual between (1) the average data function plus a constant and (2) a data function at each of the pixels contained within the left process block, and a right residual between (3) the average data function plus a constant and (4) a data function of the pixels contained within the right process block, respectively;
   setting the data function at each pixel of the left process block to equal the average data function at said each pixel of the left process block plus the left minimizing constant;
   setting the data function at each pixel of the right process block to equal the average data function at said each pixel of the right process block plus the right minimizing constant.

15. An image processing apparatus according to claim 14, wherein the average data function is calculated according to the following equation:

$$f\ ave(j) = \frac{1}{2n} \cdot \left( \sum_{i=1}^{n} \text{data}_L(i, j) + \sum_{i=1}^{n} \text{data}_R(i, j) \right)$$

where, $\text{data}_L(i,j)$ is the pixel at the ith row and the jth column in a process block of the left image, $\text{data}_R(i,j)$ is the pixel at the ith row and the jth column in the process block of the right image that corresponds to the first process block, and n is the total number of pixels in each process block for the left image and right image.

16. A computer readable storage medium which stores a computer program for causing a computer to function as a processing unit which, in a pair of images formed to generate a difference corresponding to a parallax of both eyes, performs a process of reducing a difference of at least one of the pair of images other than a geometric difference between image structures corresponding to the parallax of both eyes;
   wherein the difference other than the geometric difference between the image structures corresponding to the parallax of both eyes is a difference between noise components superposed on the pair of images; and
   wherein the reducing a difference comprises using a least-squares method, the least-squares method determining a minimizing constant that minimizes a residual between (1) an average data function plus a constant and (2) a data function over a region of one of the selected pair of images, and selling each pixel in said region to have the value of the average data function at said each pixel plus the minimizing constant;
   wherein said average function is determined based on the selected pair of images.

* * * * *